United States Patent

Traonvoez et al.

[11] Patent Number: 5,188,728
[45] Date of Patent: Feb. 23, 1993

[54] CLOGGING DISPLAY WITH SHAPE MEMORY ALLOY SPRING ACTUATOR

[75] Inventors: Jean-Michel Traonvoez, Bouffemont; Philippe Pottier, Carrieres-sur-Seine; Dominique Tertre, Croissy-sur-Seine, all of France

[73] Assignee: Le Bozec et Gautier, Courbevoie, France

[21] Appl. No.: 688,590
[22] PCT Filed: Oct. 31, 1990
[86] PCT No.: PCT/FR90/00790
   § 371 Date: Jul. 19, 1991
   § 102(e) Date: Jul. 19, 1991
[87] PCT Pub. No.: WO91/06357
   PCT Pub. Date: May 16, 1991

[30] Foreign Application Priority Data
   Oct. 31, 1989 [FR] France ............... 89 14301
   Mar. 1, 1990 [FR] France ............... 90 02595

[51] Int. Cl.$^5$ ............................ G01L 19/04
[52] U.S. Cl. ............................ 210/90; 73/744;
   116/267; 116/272; 116/DIG. 42; 210/94; 267/282
[58] Field of Search ............... 73/744, 745; 116/267, 116/268, DIG. 42, 70, 204, 272; 200/82 E; 210/90, 94, 149; 267/282; 340/607, 611

[56] References Cited

U.S. PATENT DOCUMENTS

| 2,942,572 | 6/1960 | Pall | 210/90 |
| 2,979,021 | 4/1961 | Scavuzzo | 210/90 |
| 3,140,690 | 7/1964 | Siebel | 210/90 |
| 3,595,200 | 7/1971 | Cilento | 116/267 |
| 3,748,108 | 7/1973 | Rothwarf et al. | 267/182 |
| 4,172,971 | 10/1979 | Silverwater et al. | 210/90 |
| 4,426,952 | 1/1984 | Crisp | 116/268 |
| 4,574,728 | 3/1986 | Barnard et al. | 116/267 |
| 4,745,876 | 5/1988 | Whiting | 116/268 |
| 4,792,651 | 12/1988 | Whitting | 200/82 E |
| 4,867,095 | 9/1989 | Shane et al. | 116/267 |

FOREIGN PATENT DOCUMENTS

| 2139852 | 2/1973 | Fed. Rep. of Germany | 210/90 |
| 2906784 | 9/1979 | Fed. Rep. of Germany | 210/90 |
| 8420197 | 7/1985 | France | 210/90 |
| 8202622 | 8/1982 | PCT Int'l Appl. | 210/90 |
| 2092752 | 8/1982 | United Kingdom | 210/90 |
| 2189603 | 10/1987 | United Kingdom | 210/90 |

Primary Examiner—Robert A. Dawson
Assistant Examiner—Joseph Drodge
Attorney, Agent, or Firm—Armstrong, Westerman, Hattori, McLeland & Naughton

[57] ABSTRACT

A fluid filter clogging display comprising a case of non-magnetic material divided into an upper housing, at atmospheric pressure, and a lower housing by an impermeable membrane, a piston movable in the lower housing and dividing the lower housing into a high chamber and a low chamber, the high chamber communicating with an upstream side of a filter and the lower chamber communicating with a downstream side of the filter, a magnet mounted on the piston and disposed in the high chamber, a magnetizable detector in the upper housing for sensing a position of the magnet, a return spring located in said low chamber biasing the piston towards the impermeable membrane and a helical spring made of a shape memory alloy (SMA) which is stiff above a specific temperature and compliant below such a temperature and mounted such that the SMA spring joins the magnet to the piston depending upon the temperature thereof.

21 Claims, 6 Drawing Sheets

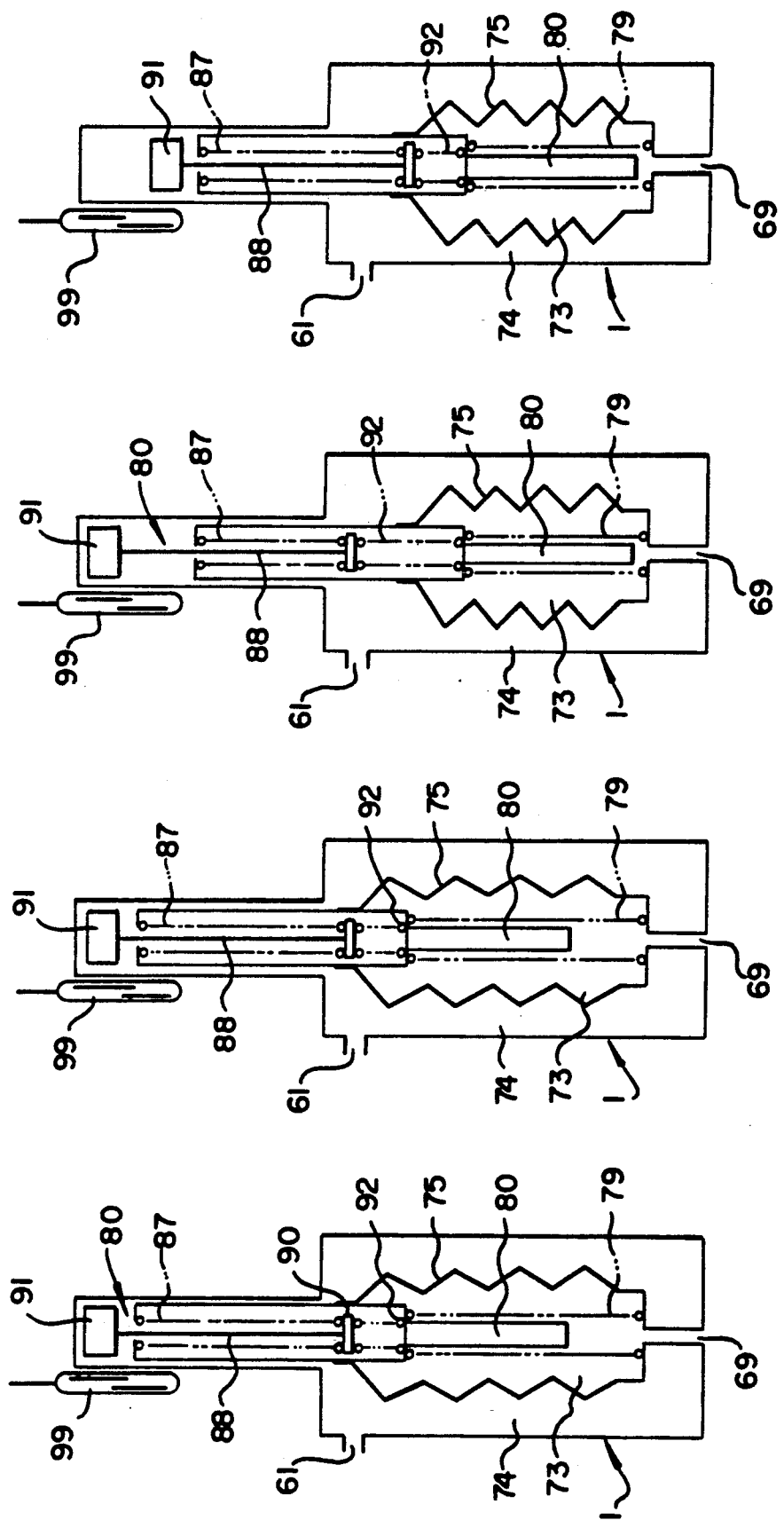

CLOGGING DISPLAY WITH SHAPE MEMORY ALLOY SPRING ACTUATOR

The invention concerns a clogging display for a fluids filter and comprising means detecting pressure variations at the ports, i.e. the upstream and downstream sides, of said filter.

It is known that the random impurities stopped by a filter impede proper fluid flow and operation of the devices downstream of said filter, progressively leading to clogging. This clogging entails a pressure differential between its ports and accordingly clogging displays comprise means detecting pressure differentials between upstream and downstream. However such pressure differentials are not caused solely by the clogging impurities, sometimes they are also due to the fluid's grade (viscosity) which often is temperature sensitive.

For a viscous liquid such as a hydrocarbon or an oil, the viscosity increases as the temperature drops, causing a substantial pressure differential across the filter ports, which the clogging display is meant to monitor, even in the absence of impurities. In that instance the display mistakes the viscosity effect for clogging.

Attempts already have been carried out to remedy this drawback, for instance in the disclosures of a number of patents such as U.S. Pat. No. 2,942,572 filed on Jun. 17, 1958 (David B PALL) and the French patent 2,558,255 filed on Jan. 12, 1984 (Facet Enterprises Inc.), namely using either a bimetallic element or a deforming split ring sensitive to the temperature of the fluid. These devices deform perpendicularly to the axis of its sliding elements and are arranged to reduce the cross-section preserved to one of these elements when the temperature is below a given value. In that instance mechanical locking of said sliding element may take place. As a result the clogging display may be inoperative at these lower temperatures.

These devices present difficulties both as regards manufacture and installing them in the display, and they are expensive. Their operation is susceptible to malfunctions.

In order to remedy these drawbacks and to improve such displays, the inventor developed a clogging display for a fluid filter of the species comprising a case with a cavity, i.e. a case, and made of a non-magnetic material, further a piston moving inside a suitable housing unit of said case, a magnet mounted on the piston and a magnet-position detector, where this clogging display is characterized in that it comprises a magnet or a magnet-equipped holder affixed to the piston head and moving in the same axis relative to said piston as a function of opposing forces, and a coiled spring made of a shape-memory alloy (SMA) which is stiff above a specified temperature and compliant below, and means for mounting the SMA spring in such a way that above a specified temperature it shall rigidly join the magnet support to the piston.

Several embodiment modes of the invention are feasible, for instance with or without mechanical flag.

In the instance of a clogging display with a sliding flag, the object of the invention is a clogging display for a fluid filter comprising a substantially cylindrical and non-magnetic case of one or more components equipped with external fasteners, said case comprising boreholes and matching boreholes on the same axis and determining two so-called upper and lower housings each open at an opposite end of the cylinder:

the upper housing receives a magnetized or magnetizable flag which moves together with its fastener inside said housing which is at atmospheric pressure, the lower housing communicates at its top with the upstream of the filter and at its bottom with the downstream and receives:
a piston dividing the housing into two so-called high and low chambers,
a magnet together with its support in the upper chamber,
a spring biasing the piston toward the bottom and located in the lower chamber of its housing,
where this clogging display is characterized in that the so-called higher chamber of the so-called lower housing moreover includes a coiled shape-memory alloy (SMA) spring which is rigid at high temperature and compliant at low temperature and with the same straight axis as the piston and which at low temperature can be compressed by a trivial force, said SMA spring being mounted in such a way as to rigidly join, or not, the magnet to the piston depending on the temperature being high, or not. The SMA spring is located between a stop solidly joined to the magnet and a stop solidly joined to the piston. When hot and because of its stiffness, the SMA spring rigidly connects the magnet to the piston and any motion by this piston entails a motion of the magnet. When cold, the SMA spring is compliant and allows displacing the piston without moving the magnet.

The operation of the coiled SMA spring used in the invention is especially reliable. Its manufacture and installation are especially easy.

As regards clogging displays of this type, the two housings are machined along the same axis, one at each end of the cylinder. The housings are kept apart by an impermeable, machined membrane with a thickness between 2/10 and 10/10 mm. The lower part of the lower housing (connected downstream of the filter) is closed by any known means, for instance by a washer of which the central orifice rim is raised inward into a collar guiding the piston return spring. The so-called lower chamber communicates through the central washer aperture with the filter downstream side.

Outwardly this piston comprises two main parts defining between them a shoulder on which rests the return spring, the higher part (of larger cross-section) being fitted with a seal, for instance an O-ring, which divides the housing into two chambers, namely an upper and a lower chamber. Moreover the piston is axially bored from the head so as to provide a housing. A circular groove is present in the borehole wall near its aperture.

Preferably the magnet shall be affixed to a magnet holder of which the shape matches the display size. The magnet holder may be mere ring and the SMA spring is present between its base and the piston in the above described manner. The magnet holder also may be different and for instance consist on one hand of an axial rod with a circular rib near its lower end and on the other hand of a cup containing the magnet at its upper end.

In the latter instance, the SMA spring is mounted around the magnet-holder rod and thereby is guided and held in place. This rod is slipped into the piston borehole and is retained in place by a washer or a circlip in the groove in the piston borehole. Following assembly, the SMA spring encloses the magnet-holder rod and is present between the circular rib on said rod and the washer or circlip.

The SMA spring is made of a titanium-nickel alloy or of a copper-zinc-aluminum alloy.

The clogging display of the invention furthermore comprises an upper housing which may open to the atmosphere and which consists of two parts, namely a first part closed at its base and constituting the base of the first housing and a high part of larger diameter widely opening to the outside and thus defining a shoulder.

At its upper part the case outwardly comprises a complex component comprising a capping part acting as a stopper for the upper orifice and centrally bored to pass a flag. This capping part may revolve by any suitable means around the outward wall of the upper part of the display case.

A set of components is present in the upper housing and affixes the clogging flag comprising a rod (or a vertical bar) with a magnet at its base that can be applied against the membrane separating the two upper and lower housings, further a ring with a color sharply contrasting with that of the other components and affixed to the top of the flag rod and following the motion of said flag and visible from the outside when the filter is clogged. At its base the ring comprises a collar pointing to the outside and able to rest against a shoulder of the stopper, further a circular external groove, a circular inner rib at the high part, and a return spring resting against this rib.

The capping part includes an extension with a chamber housing a switch. A means is provided to actuate the switch in relation to the flag position.

Different embodiment modes of the invention may be implemented, for instance lacking a mechanical flag, and with magnetic-flux sensors.

Such a filter clogging display of the invention comprises a main case made of a non-magnetic material (in one or more parts) with a downwardly open housing, with a piston that slides inside the housing, with a magnet affixed to the piston head and pointing toward the housing bottom, with a means dividing the housing into two chambers, one called the low chamber and communicating with the filter downstream side, the other called the high chamber and communicating with the filter upstream side, in such manner that when the pressure in the high chamber exceeds that of the low chamber, a pressure differential shall be generated that may exceed a specified value, in which event the piston will be displaced. It must be emphasized with respect to the invention that the means affixing the magnetic to the piston comprises two springs, one of which is a shape-memory alloy (SMA) spring with the same axis as the piston and allowing automatically to rigidly join the magnet to the piston when the temperature exceeds a predetermined value, in which instance the piston may then move the magnet relative to the external magnetic-flux sensor at a specified point. In the present invention this sensor is a double-blade, or double-reed switch in which the blades respond to the magnetic flux and in the form of a small glass bulb connected to a suitable electric device.

The magnet is mounted on a magnet holder comprising a comparatively long axial rod with a circular rib near its downward pointing free end.

The piston comprises a deep axial borehole open upwards and there is a retaining means (washer) near its aperture. The shape memory alloy spring is mounted so it will be between the rib at its lower end and the retaining washer at its upper end.

The conventional opposing spring is mounted between the rib at its upper end and the bottom of the piston-head borehole.

In this kind of clogging display, there is a case of which the downwardly open, axial borehole consists of two parts, an upper and a lower part, and it is divided into two chambers, namely an upper and a lower chamber by a partition consisting of an elastomer bellows fastened on one hand to the base of the upper part of the movable piston and on the other hand to a means forming the stationary base of the housing.

The described clogging display consists of two main components. It comprises a case on which a cap is mounted which comprises at least one glass bulb with flexible blades or reeds. In the instance of several glass bulbs, they will be arranged at different levels along the periphery of the case of which the walls are thin. In the event of a plurality of glass bulbs, a thin metal sleeve may be inserted between the case inside which the magnet may move and the glass bulbs, a window being provided at the level of said glass bulbs.

To elucidate the invention, several illustrative embodiments are discussed below in relation to the attached drawings.

Figure 1:
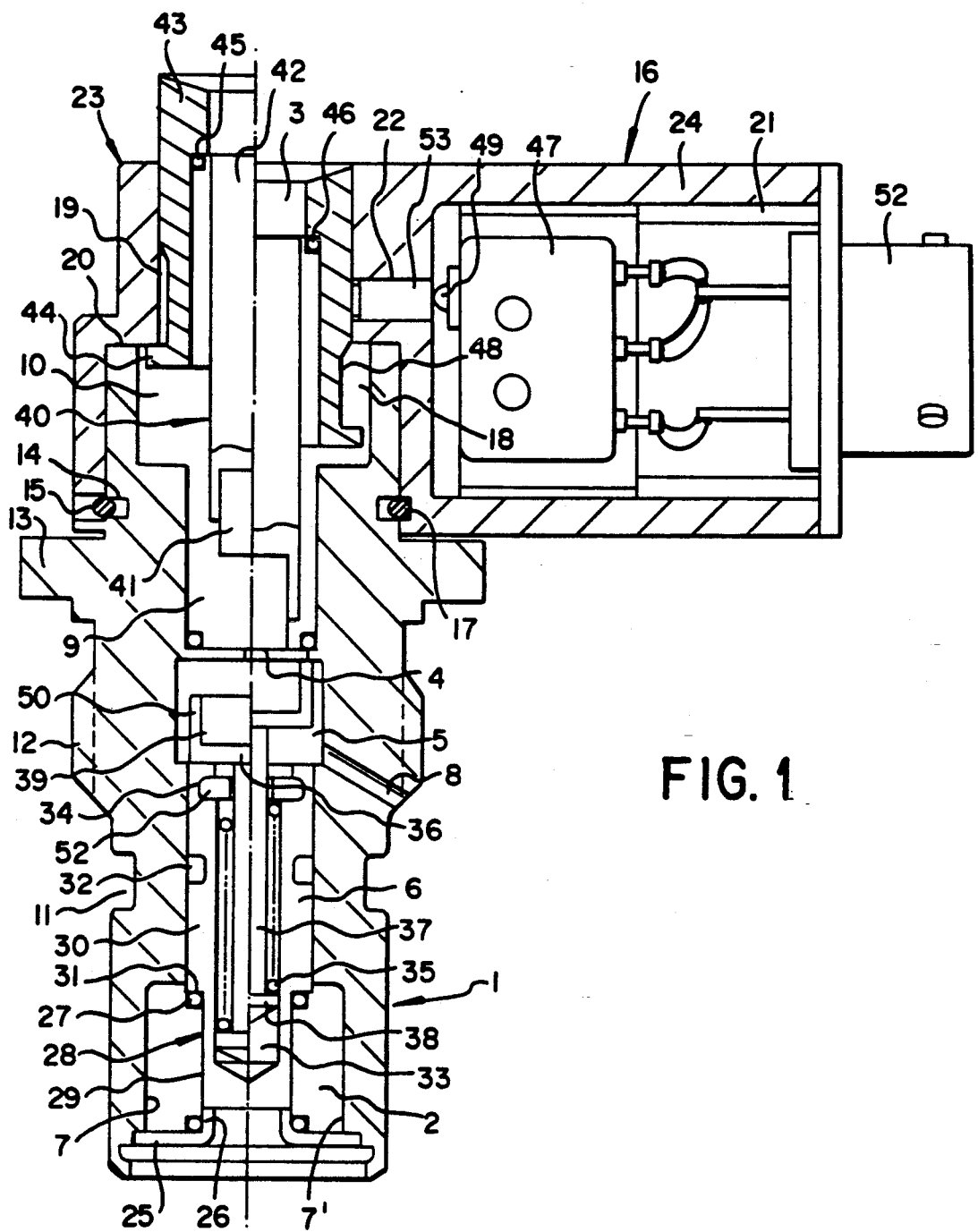
FIG. 1 is a cross-section of the clogging display with flag.
Figure 2:
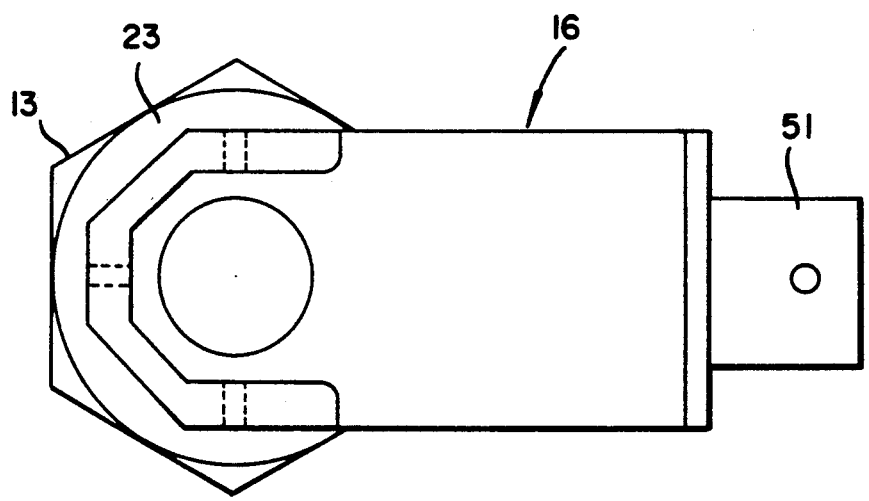
FIG. 2 is a topview of the display of FIG. 1.
Figure 3:
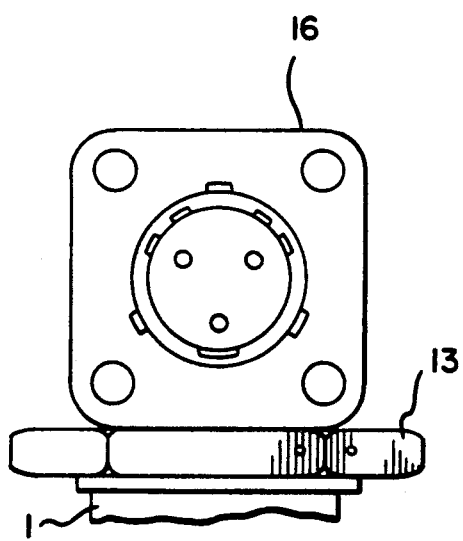
FIG. 3 is a sideview of the display of FIG. 1.
Figure 9:
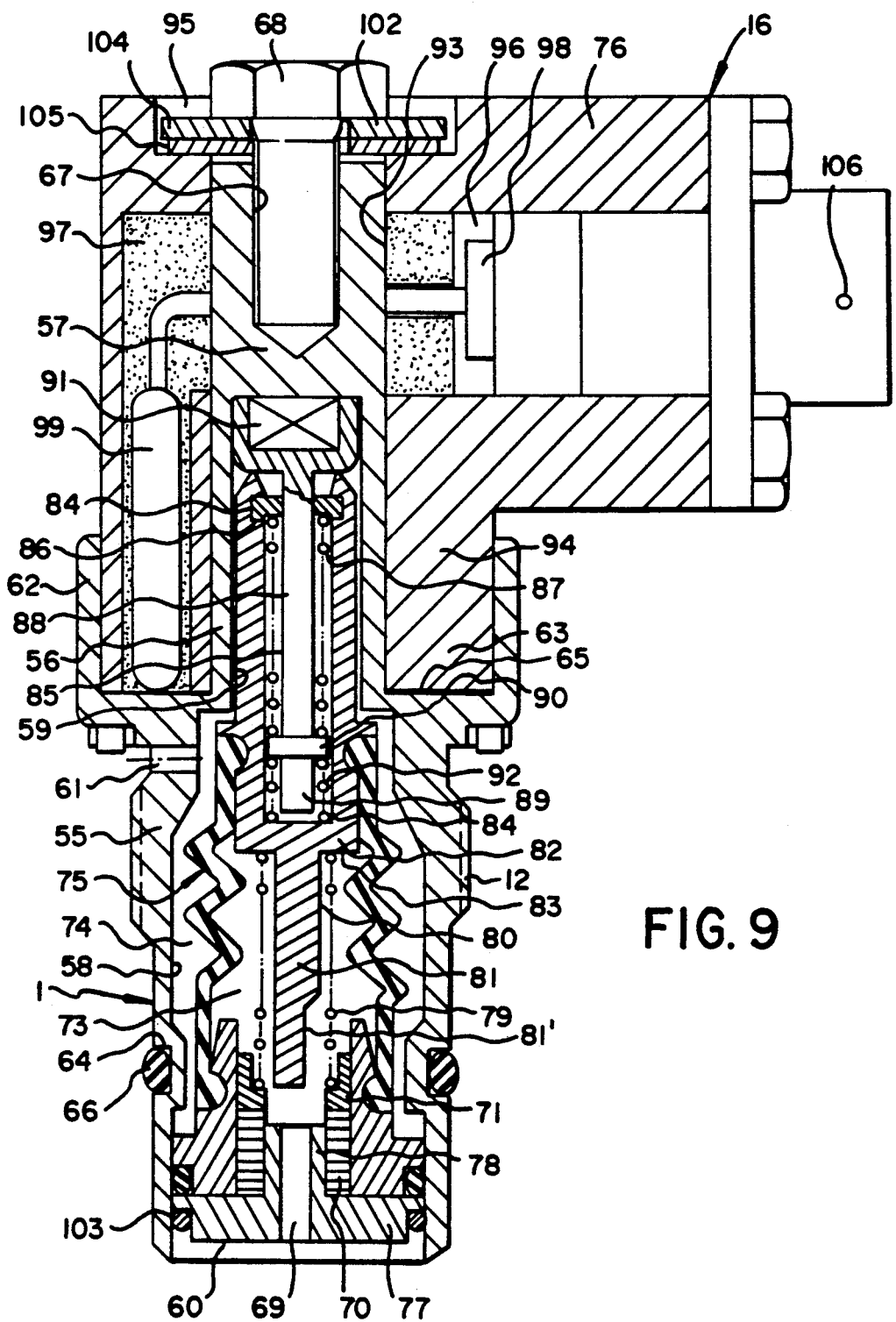
Figure 14:
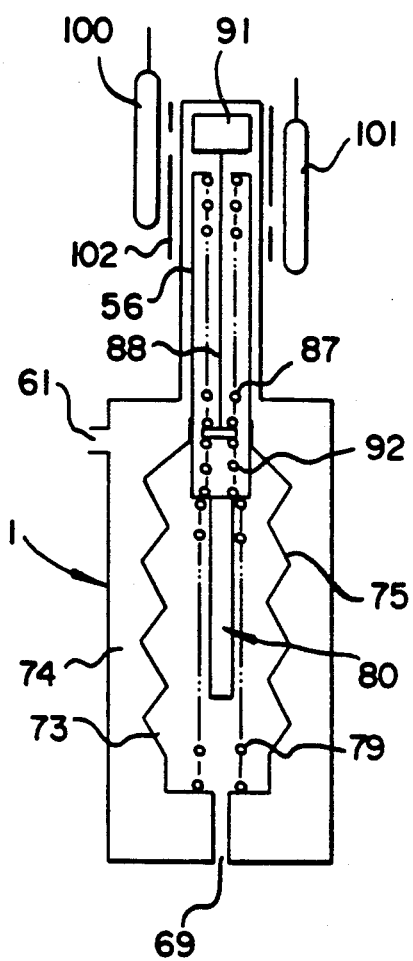
Figure 15:
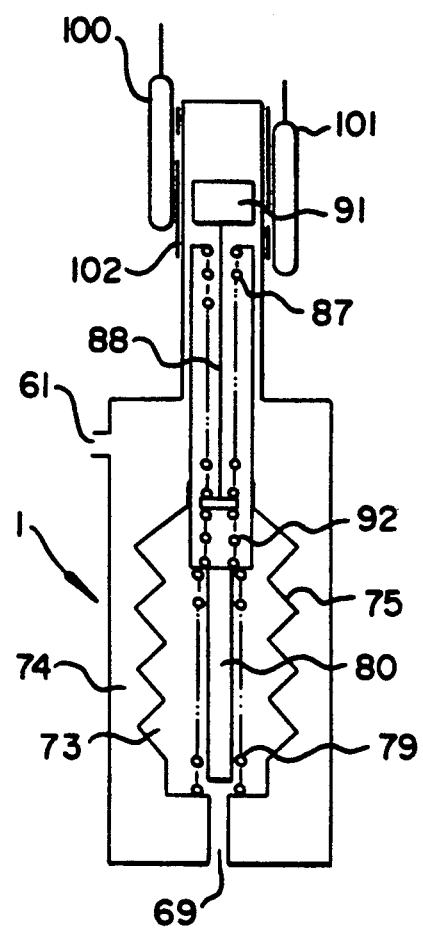

FIGS. 4-8 schematically show the operation of the device of FIG. 1,

FIG. 9 is a cross-section of a display with a flexible-blades glass bulb, i.e., a reed switch or relay, FIGS. 10-13 are operational diagrams for one glass bulb, and FIGS. 14, 15 are operational diagrams for two glass bulbs.

In the first embodiment mode, the case 1 of the clogging display consists of one or more components made of a non-magnetic material (for instance an aluminum alloy), this case being axially bored from each end in order to define two housings 2 and 3 separated by an impermeable membrane 4 of which the thickness is determined by machining the two housings. The thickness of this membrane 4 shall be between 2/10 and 10/10 mm and preferably it is 5/10 mm. In this manner the two housings 2 and 3 are wholly apart and herein they are called resp. lower and upper housings.

The housing 2 has three parts. The upper part 5 shown in the Figure is called the high chamber and communicates with the filter upstream side (or with the device causing the load difference which must be detected) through a duct 8 through the wall of the case 1; the filter itself is omitted from the Figure.

In the embodiment mode of FIG. 1, the central part of the housing 2 evinces a lesser diameter than the other two parts and is substantially longer. The low part 7 is extensively open at its lower end and its flange 7' is machined in such manner that it seats a closing means, thereby defining the low chamber (same reference 7).

The housing 3 consists of two parts 9 and 10, with latter of a wider diameter. The part 9, which moves in front of the chamber 5, uses as its bottom the membrane 4 cited above and impermeably separating the housings 2 and 3.

The chamber 10 is substantially open to the atmosphere at its upper zone.

On the outside, the case 1 comprises the following:
near the cylindrical chamber 6, a groove 11 and an omitted O-ring,
near the chamber 5, a thread 12,
near the chamber 9, a hexagonal collar 13,
near the chamber 9, a groove 14 receiving a metal retainer ring 15.

In FIG. 1, the reference 16 denotes a multi-use, compound component of which one part forms the stopper 23 because capping the chamber 10 of the case 1 onto which it is kept in place by the retainer ring 15 entering a groove 17 provided for that purpose on its base in cooperation with the groove 14 provided on the periphery of the case 1 above the collar 13. Accordingly the component 16 is able to rotate on the case 1. The stopper 23 of the component 16 comprises a vertical and continuous borehole defining two consecutive passageways 18 and 19 which subtend between them a shoulder 20 opposite the upper end (as seen in the Figure) of the case 1 and exceeding the inside circumference of the chamber 10. An extension 24 is present perpendicularly to the common axis of the two passageways 18 and 19 and is machined so as define a chamber 21 of which the bottom communicates through a borehole 22 with the chamber 19 of the stopper 23.

The set constituted by the case 1 and the component 16 represents the container for the clogging display. The case 1 is conventionally screwed onto the filter or a support, whereas the component 16 is free to pivot on that part of the case 1 which is outside the filter.

Said container comprises a washer 25 at its lower part, the rim of the central orifice of said washer being raised to form a collar 26. This washer 25 is kept in place in the orifice 7' by any known means such as ring or clip. The base of a calibrated, helical spring 27 enclosing the lower part 29 of a piston 28 rests on said washer 25 and around the guiding collar 26. In FIG. 1, the inner moving parts, including the piston, are shown as follows: in the ALARM position on the left of the axis and in the REST position at the right of the axis. The piston 28 consists of two main parts 29 and 30 subtending a shoulder 31 clearly shown in the Figure. Accordingly the spring 27 is located between this shoulder 31 and the washer 25. The rod 30 (or plunger) of the piston 28 comprises a groove 32 to retain in it a seal, for instance an O-ring. Inside, the piston 28 is axially bored to defined a housing 33, and a circular groove 34 is present near its aperture to hold a two-part washer 52 in turn retaining a spring 35 of which the characteristics and its vital importance shall be discussed comprehensively below. The bar 37 of a magnet-holder 36 can slide inside the housing 33. The free base of the bar 37 comprises a circular rib 38 defining on one hand a stop shoulder for the spring which is made of a shape memory alloy and on the other hand a guide in the housing 33. The upper part of the bar 37 is cleared into a cup-shape or is provided with a cup 50 holding a magnet 39.

When in the rest position and in the thermostatically locked position, the magnet 39 is forced against the membrane 4 (on the right in FIG. 1).

A sub-assembly 40 including the display flag is located on the other side of this membrane 4.

This flag consists of a magnetic bar or of a magnet 41 suitably fastened in a cup 51 of a rod or bar 42. A ring 43 of a different color than the other parts, and preferably red, is mounted around the upper part of this rod or bar 42. A collar 44 preventing the ring 43 from leaving the chamber 19 is affixed to the base of said ring. The ring 43 is shaped in such manner that one inner end zone shall be of a lesser diameter in order to define a shoulder 45. The rod (or bar) 42 and the ring 43 are rigidly joined together in this end zone, for instance by a force-fit. Between the outer wall of the bar 42 and the inner wall of the ring 43, the shoulder 45 defines a cylindrical space housing a helical spring 46. The spring 46 encloses the bar 42, and, being located between the membrane 4 and the shoulder 45, it stresses the ring 43 outward. The ring 43 comprises a groove 48 on its outside above the collar 44.

The component 16 comprises an extension 24 of which the chamber 21 houses a switch 47 or any other equivalent electric means with a pushbutton 49 and opposite the borehole 22. If the pushbutton is too short to reach the ring 43, a movable shim or spacer acting as additional pushbotton accessory 53 (FIG. 7) shall be placed in the borehole 22. The pushbutton accessory 53 is elastically repelled by the button 49 against the wall of the ring 43. Reference 52 in FIG. 1 denotes a connector screwed into the component 16.

Figure 8:
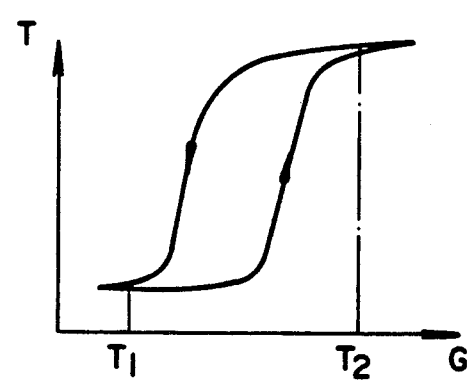

FIGS. 4–7 show the various possible combinations of the moving parts inside the case 1 of the clogging display and FIG. 8 shows the hysteresis curve as a function of temperature of the spring 35.

Figure 4:
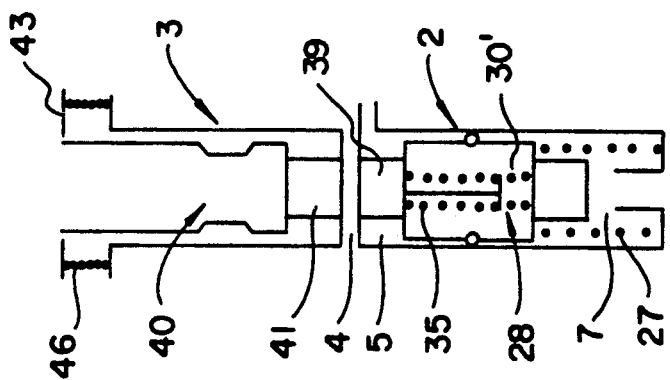

FIG. 4 diagrammatically shows the respective positions of the piston 28 and of the flag 40 when at low temperature (the SMA spring 35 being complaint) when the temperature differential of the chambers 5 and 7 is too low to overcome the force of spring 27. The plunger 30 of the piston 28 in this instance is repelled by the spring 27 toward the bottom of its housing 2 and it strongly forces the magnet 39 against the impermeable membrane 4. The magnet 39 attracts the magnetized (or magnetizable) bar 41 of the flag 40 adhering to the membrane 4. The force from the magnetic field exceeds that of the spring 46 and the flag set 40 remains in its housing 3, the ring 43 being unable to leave.

FIG. 5 again schematically shows the respective positions of the piston 28 and of the flag 40 for the low-temperature instance (compliant spring 35), in this instance however the pressure differential of the chambers 5 and 7 being sufficient to overcome the force exerted by the spring 27. Now the plunger 30 moves to 30' due to the pressure in chamber 5.

The washer 52, which is rigidly affixed to the plunger, also is displaced downward and compresses the spring 35 between itself and the rib 38 of the rod 37 of the magnet holder 36. The spring 35 being compliant (on account of low temperature in the instance of FIG. 5), it is unable to repel the rib 38 downward and therefore it cannot "detach" the magnet 39 from the membrane 4. The force exerted by the magnetic field is larger than that from the spring 35. The magnetic field being constant, the flag 40 therefore remains in the position shown in FIG. 4.

Figure 6:
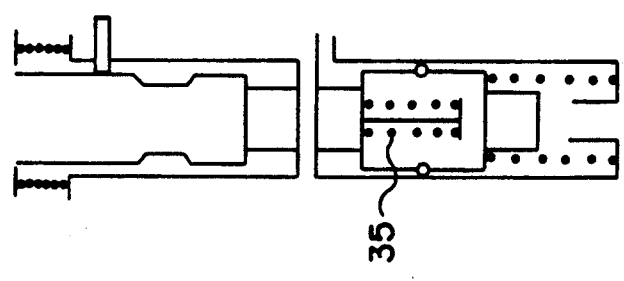

FIG. 6 shows the position of the piston 28 and of the flag 40 when the temperature is high and the pressure differential of the chambers 5 and 7 is insufficient to overcome the force exerted by the spring 27. The plunger 30 of the piston 28 in this instance is forced back by the spring 27 toward the bottom of its housing 2. On the other hand the SMA spring 35 is stiff and takes up all the space between the washer 25 and the rib 38 without displacing the rod 37 relative to the impermeable membrane 4. The magnetic field being constant, the flag 40 remains in the position shown in FIGS. 4 and 5, the ring 43 remaining in place too.

Figure 7:
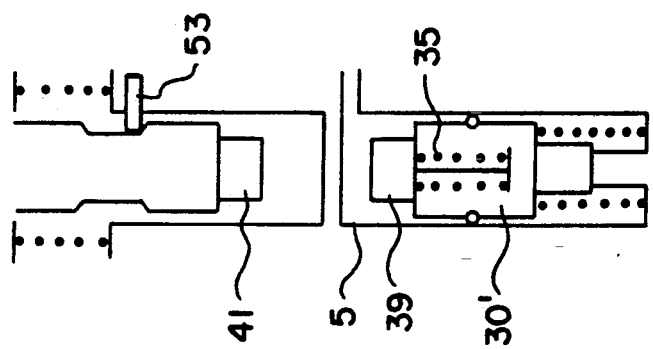

FIG. 7 shows the position of the piston 28 and of the flag 40 when the temperature is high and the pressure differential of the chambers 5 and 7 is sufficient to overcome the force from the spring 27. Now the plunger 30 moves to 30' because of the pressure in chamber 5. The SMA spring 35 now being stiff, it rigidly connects the magnet holder 36 to the piston 28 and when moving drives said magnet holder 39 downward together with the magnet 39 which therefore moves away from the membrane 4. The magnetic field no longer sufficing to attract the bar 41, the flag set 40 is raised on account of the spring 46. The ring 43 leaves the housing 3 and becomes quite visible, while at the same time the button 49 or 53 may enter the groove 48 of the ring 43 and transmit the information of this new position to the switch 47.

The operation of the clogging display of the invention may be explained in still further detail as follows:

The detector communicates with the omitted filter through the duct 8 whereby the fluid upstream of the filter can fill the chamber 5. Chamber 7 communicates with the downstream filter side.

The piston 28 is permanently biased by the return spring 27 toward the housing bottom 4 and in the event the pressure in chamber 5 is higher than in chamber 2, said piston is subjected to the opposite direction pressure differential. Therefore if the pressure differential of the chambers 5 and 7 is large (clogged filter), the piston 28 will pull back until coming to a stop against the collar 26 of the washer 25.

The spring 35 is made of a shape memory alloy (SMA), for instance nickel-titanium or copper-zinc-aluminum. Such a spring is stiff at so-called high temperatures (for instance above 30° C.) and compliant below, abstraction made of hysteresis. As the temperature moves from T1 to T2, the spring loses compliance at T2. When the temperature moves from T2 to T1, the spring will be compliant below T1. Depending on particulars, the spring is compliant or not between T1 and T2 (for instance between 30° and 40° C.). As a rule, the fluid viscosity does not substantially change between 30° and 40° C. and operation is not affected by hysteresis.

Two forces act on the magnet holder 36, that from the SMA spring 35 and the magnetization force from the magnet 39 through the membrane 4 on the magnet or magnetic bar 41.

In the event of clogging and when the spring 35 moves from a low to a high temperature, the magnetization force must be overcome, and furthermore the magnet holder 36 must be pushed back, whereby a significant air gap arises between the magnet 39 and the bar 41. The magnetic effect being eliminated, the spring 46 repels the flag 40 with its color ring 43. This position is diagrammatically indicated in FIG. 7. At this time, the button 49 drops into the groove 48 and the switch 49 changes state on account of an internal spring. This is a remote display of filter clogging.

Figure 5:
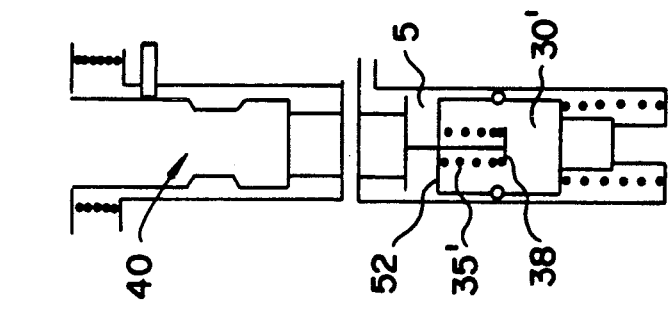

If the spring 35 is cold and compliant, the magnetization force exceeds the spring force on the magnet holder 36 which remains fixed in place and resting against the membrane 4; the flag 40 also stays in place, as schematically shown in FIG. 5.

When the pressure differential of chambers 5 and 7 is low, and the force exerted thereby is less than that of the spring 27, the piston 28 remains in the high position as shown in FIG. 4.

When the flag 40 is extended, it remains so until manually reset. Resetting presumes the instance shown by FIG. 4.

In summary, besides ease of manufacture, the use of the axial, helical SMA spring 35 makes it possible to leave the clogging display inoperative at low temperatures without the need for a stop means which must rest against the lateral wall (and/or a groove) of a moving part and acting as a brake, whereby the operation of said clogging display would be adversely affected.

In the invention, when the temperature is high, the clogging display shall have automatically become operative (FIG. 6) and is able to abruptly enter the ALARM position without the danger of stopping in an intermediate position (FIG. 7). Accordingly this clogging display amounts to a substantial advance in reliability of issued information and consequently it provides significant additional reliability to such equipment in which it would be used, for instance airplanes.

Other embodiment modes of the clogging display of the present invention are possible, which comprise using a SMA helical spring under the same conditions.

One embodiment mode is shown in FIGS. 9 through 15, and, in relation to FIG. 9, it will be noted that on the outside the clogging display consists of a case 1 and an upper component 16, called the "cap", which are joined together by a screw 68.

The case 1 comprises a lower cylindrical part 55 on top of which there is a smaller-diameter cylindrical part 56 and with a cup 62 at the junction of said two parts and defining a circular gutter 63 open in the direction of the high end of the cylinder 56. A threaded zone 12 is present on the part 55 to permit affixing the display on its omitted support. A duct 61 passes through the wall of the part 55 between this threaded zone 12 and the cup 63. The part 55 comprises a circular groove 64 housing an O-ring 66 between the threaded zone 12 and the lower end 60.

The case 1 consists of one or more components made of a non-magnetic material such as aluminum and its comprises an axial borehole at each end to define on one hand a hole 67 which is open upwards. This hole 67 is threaded to permit screwing the screw 68 into the case 1. The housing 58 is provided in the lower part 55 of the case 1 and the housing 59, of lesser diameter but along the same axis, is present in the part 56 of said case 1. A partition 57 is present between the bottom of the housing 59 and the hole 67 and separates both completely.

In its lower part 60, the housing 58 is closed by a washer 77 of which the central-aperture rim is raised to form a collar 78 defining a passageway 69. This washer 77 is affixed by its periphery and by means of a metal stop ring 103 to the open base of the housing 58. The collar 78 is enclosed by a small cylinder 70 consisting of superposed washers so that, if called for, the height may be adjusted by changing the number of said washers. At its upper part the small cylinder 70 is provided with spring guide 71 comprising a shoulder. Another cylindrical part 72 encloses said small cylinder 70 in impermeable manner in the lower end 60 of the housing 58 just above the washer 77.

The detector of the clogging display is present in the housings 58 and 59 between their low and high ends 60 and 57. Essentially it comprises a piston 80 and a magnet holder 88 with the same axis and able to slightly shift relative to one another.

This piston 80 consists of two main parts, namely a lower part 81 and a larger-diameter higher part 82 which define a shoulder 83 clearly shown by FIG. 9. The lower part 81 is of such length that in its extremely low position it shall rest against the upper part of the collar 78. At its lower end the part 81 comprises a clearance 81' in order not to obstruct the passageway 69 when in its stopped position. A conventional helical spring 79 encloses this part 81 of the piston 80 and rests on one hand on the shoulder of the spring guide 71 at its base, and on the other hand against the shoulder 83 at its top.

The upper part 87 of the piston 80 comprises an axial borehole from top to bottom to define a housing 85 and it is hollowed near its aperture to seat a so-called sealing washer denoted by 84 and composed of two parts, which keeps in place a shape memory alloy (SMA) spring 87 of which the characteristics and the vital function are described in detail further below. The rod 89 of the magnet holder 88 can slide inside the housing 85. A rib 90 is present near the free base of this rod 89 and defines at the top a stop shoulder for the SMA spring 87 and at its bottom another shoulder to support an opposing spring 92. The opposite end of this spring 92 rests on the bottom of the housing 85 of the piston. Moreover the rib 90 may constitute a guide means for the rod 89 inside the housing 85. The upper part of this rod 89 is cleared into an omitted cup-shape present externally beyond the upper part 82 of the piston 80. The cup contains the magnet.

The housing 58 is divided into two chambers 73 and 74 by an elastomeric, impermeable bellows 75. This bellows 75 is affixed on one hand at its lower part to the stationary cylindrical part 72 and at its upper part to the base of the part 82 of the (movable) piston 80, the chamber 74 encloses the bellows 75, the part 82 of the piston 80 and also the magnet support 88 and the magnet 91. The chamber 74 communicates by the duct 61 with the filter upstream side. The chamber 73 inside the bellows 75 encloses the lower part 81 of the piston 80 and it communicates through the passageway 69 in the closing washer 77 with the filter downstream side. The downstream and upstream sides of the filter also are isolated by the seal 66.

The cap 16 is perforated by a suitable hole 93 so it can be slipped around the upper part 56 of the case 1. This cap 16 comprises a cylindrical base 94 designed to be housed in the gutter 63. The depth of this gutter is adjustable using the washers 65. A first hole 95 is present in the upper part of the hole proper 93 to seat the locking washers 104 and the head of the tightening screw 68. The cylindrical base 94 comprises at least one housing receiving a microswitch responding to the position of a magnet. FIG. 9 shows a glass bulb 99, also called a flexible blade switch, commonly called "reed relay". Contact is made or not depending on the change in magnetic field generated by the magnet 91. Advantageously the glass bulb 99 is enclosed by a non-metal sheath 97. The glass bulb is connected in known manner to a suitable electrical connector 98 received in an extension 76 of the cap 16. FIG. 9 illustratively shows a bayonet device 106.

In another embodiment mode, the cap may comprise several glass bulbs 100–101 mounted at different heights along the circumference of the cylindrical part 56 enclosing the housing 59.

When being displaced (FIGS. 14, 15), the magnet 91 shall consecutively act on the reeds of the glass bulbs 100–101, making it possible thereby to monitor the position of said magnet 91. This position depends on the pressure differential of the upstream and downstream filter sides in the presence of sufficient temperature. To avoid that the magnetic flux from the magnet 91 simultaneously affect two consecutive glass bulbs, the cylindrical part 56 is enclosed by a thin metal sleeve 102 with an aperture appropriately opposite each glass bulb so that the magnetic flux can only pass through these apertures.

The operation of the clogging display of the invention can be elucidated as follows:

The detector communicates through the duct 61 with the omitted filter, whereby the fluid pressure upstream of said filter also may be identically set up in the chamber 74. The chamber 73 communicates through a passageway 69 with the filter downstream side.

The piston 80 is biased by the return spring 79 toward the bottom 57 of the housing 58 and, if the pressure in chamber 74 exceeds that in the chamber 73, is subjected to the pressure differential acting in the opposite direction of the bias of said spring 79. Consequently, if the temperature is sufficiently high, and the force resulting from the pressure differential of the chambers 74 and 73 exceeds the force exerted by the spring 79 on the piston 80, then said piston 80 will move back (FIGS. 12 and 13). By adjusting the bias from the spring 79 on the piston 80 by means of the washers 70, the displacement threshold trigger of said piston 80 can be adjusted. If the pressure differential increases strongly, the excursion of the piston 80 is limited by the stop formed by the collar 78.

The spring 87 is made of a shape memory alloy (SMA) illustratively based on nickel-titanium or copper-zinc-aluminum. Such a spring is stiff at the so-called high temperatures (for instance >30° C.) and compliant below, abstraction made of hysteresis. When the temperature moves from T1 to T2, the spring becomes stiff at T2. When the temperature passes from T2 to T1, the spring will be compliant when at less than T1. Depending on the instance, the spring shall be stiff or compliant between T1 and T2 (for instance between 30° and 40° C.). As a rule the fluid viscosity does not change much between 30° and 40° C. and operation is unaffected by hysteresis.

The magnet holder 88 is subjected to two forces, namely that exerted by the SMA spring 87 and that from the spring 92 located on each side of the circular rib 90. When the force exerted by the SMA spring 87 exceeds that from the conventional spring 92, the magnet holder will be rigidly connected to the piston 80. Otherwise, when the force exerted by the SMA spring 87 is less than that from the conventional spring 92, latter will push upward the rib 90 and the entire magnet holder 88 until the cup and/or the magnet 91 come to rest against the partition 57 regardless of the position of the piston 80.

The springs 87 and 92 are designed in such manner that for temperatures >T2, the spring 92 shall exert a force on the magnet holder 88 which is much less than that from the SMA spring 87, and so that for temperatures <T1, the spring 92 shall exert a force much higher than that from the SMA spring 87.

When there is no clogging, the piston being in the high position, the magnet holder 88 also shall be, regardless of the temperature (FIGS. 10, 11).

As soon as clogging occurs, the piston 80 moves back and, for the instance of a hot spring, both the magnet holder 88 and the magnet 91 move back too (FIG. 12), causing a change in magnetic field. Thereupon the glass bulb 99 is actuated by this change and closes an electric circuit. In the embodiment of FIGS. 14 and 15, the glass bulb 99 is replaced by two glass bulbs 100 and 101 located at two different levels, the magnetic flux first affecting glass bulb 100 and then glass bulb 101 if there is significant clogging. The number of glass bulbs also may be higher than two in order to precisely monitor clogging or unclogging.

The Figures show the instance of the signal being due to closing an electric circuit, however the reverse is obviously feasible as well.

In the instance of low temperature (for instance less than 30° C.), the SMA spring 87 is compliant and the magnet holder 88 no longer is solidly joined to the piston 80 (FIGS. 10, 11). FIG. 10 shows the instance of the filter not being clogged and the spring 92 pushing the piston 80 upward. On the other hand FIG. 12 shows the instance of clogging (at low temperature) wherein the pressure differential of the chambers 73 and 74 forces the piston down, however without carrying along the magnet 91 forced against the partition 57. Accordingly the position of the magnet 91 is identical in this instance with that when the piston 80 is in the high position, that is when there is no clogging. At low temperature, for instance below 30° C., the clogging detector is inoperative.

The clogging display of the invention lacks any means for locking in place the piston 80 or the magnet holder 88 and hence the magnet 91, and furthermore it lacks any flag requiring manual resetting. Thereby the described display remains permanently operative without need for resetting it. Accordingly this clogging display constitutes substantial progress in the reliability of the provided information and consequently substantial additional reliability to the equipment into which it is integrated, in particular aircraft.

We claim:

1. A clogging display comprising a case (1) made of a non-magnetic material, having a piston (80) which can move inside a suitable housing (58-59) in said case (91), a magnet (91) mounted on the piston (80) in a magnet holder (88), and a detector means for sensing the position of the magnet (91), said clogging display being characterized in that the magnet (91) is joined to a head (82) of the piston (80) and can move relative to said piston as a function of the opposing forces of two springs, of which one, a shape memory alloy (SMA) spring (87) is stiff above a specified temperature and compliant below, while the other spring (92) is made of a conventional alloy and has a force less than that of the SMA spring (87) when the SMA spring is hot but larger than the force exerted by the SMA spring (87) when the SMA spring is cold, and means for so arranging the springs that when hot, the SMA spring (87) rigidly joins the magnet holder (88) to the piston (80) whereas when the SMA spring is cold, the other spring (92) repels the magnet holder (88) against the bottom of the housing (59).

2. A filter clogging display as defined in claim 1, wherein said housing (58-59) opens downward, a piston (80) which can slide inside the housing, the magnet (91) affixed to the head of the piston (80) is arranged to point toward the housing bottom, and further comprises a means (75) dividing the housing (58-59) into two chambers (73-74), a low chamber (73) communicating with a filter downstream side and a high chamber (74) communicating with a filter upstream side in such manner that when the pressure in the high chamber (74) exceeds that in the low chamber (73), a pressure differential is generated which may exceed a given magnitude, whereupon the piston (80) is displaced, and wherein said detector means comprises at least one glass bulb (99) of flexible reeds sensitive to magnetic flux, said detector means being connected to a suitable electric device.

3. The clogging display defined in claim 1, wherein said magnet holder (88) has a rod (89) having a circular rib (90), characterized in that the SMA spring (87) rests against an upper side of the rib (90) and said other spring (92) rests against its lower side.

4. The clogging display defined in any one of claims 1 through 3, wherein said case housing comprises two axial parts, a low part (58) and a high part (59), and further said piston (80) is in two parts, a low part (81) and a high part (82), characterized in that the housing is divided in two chambers, a low chamber (73) and a high chamber (74), by means of a flexible and impermeable partition (75) consisting of an elastomeric bellows affixed to a base of the high part (82) of the piston (80) and to a device closing a base (60) of the housing (58).

5. The clogging display defined in claim 4, characterized in that a thin metal sleeve is inserted between the case (1) and the glass bulbs (100-101) and comprises one window per glass bulb.

6. The clogging display defined in any one of claims 1 through 3, wherein said case (1) is overlain by a component (16) forming a cap, characterized in that the cap has at least two switches (100-101) responding to magnetic flux and the display has glass bulbs located at different levels along the periphery of the case (1).

7. The clogging display defined in claim 3 wherein said piston (80) has an axial borehole (85) having a circular groove (86) and provided with a washer (84), the spring (87) made of a shape memory alloy (SMA) being present between the rib (90) and the washer (84), said other spring (92) being between the rib (90) and the bottom of the housing (85).

8. A fluid filter clogging display comprising a case (1) of non-magnetic material; said case being divided into an upper housing (3), which is at atmospheric pressure, and a lower housing (2), by an impermeable membrane (4);

a piston (28) movable in the lower housing which divides said lower housing (2) into a high chamber (5) and a low chamber (7), said high chamber (5) communicating with an upstream side of a filter and said lower chamber (2) communicating with a downstream side of said filter;

a magnet (39) mounted on said piston (28) and disposed in said high chamber (5);

a magnetizable detector (40) in said upper housing (3) for sensing a position of said magnet (39);

a return spring (27 for said piston (28) located in said low chamber (7) biasing said piston towards said impermeable membrane (4); and a helical spring (35) made of a shape memory alloy (SMA) which is stiff above a specific temperature and compliant below such a temperature and mounted such that said SMA spring joins said magnet (29) to said piston (28) depending upon the temperature thereof.

9. The clogging display defined in claim 8, characterized in that said impermeable membrane (4) is made by machining and with a thickness between 2/10 and 10/10 mm.

10. The clogging display defined in claim 8, characterized in that the low chamber (7) of the lower housing (2) is closed by a washer (25) of which its central orifice is raised to form a collar (26) acting as a guide for the return spring (27) of the piston (28).

11. The clogging display defined in claim 8, characterized in that the piston (28) comprises two external main parts (28 and 29) having between them a shoulder (31) against which rests the return spring (27), and a part (30) being provided with an O-ring seal (32), the piston (28) furthermore comprising an axial borehole starting at its head so as to provide a housing (33), a circular groove (34) being present near an aperture of said piston housing.

12. The clogging display defined in claim 10 characterized in that the magnet (39) is disposed in a magnet holder (36), and said magnet holder (36) consists of an axial rod (37) having a circular rib (38) near a free lower end and of a cup (5) receiving the magnet holder (36) at an upper part.

13. The clogging display as defined in claim 11, characterized in that the shape memory alloy (SMA) spring (35) encloses the rod (37) of the magnet holder (36) and is located between the circular rib (38) of said rod (37) and a lockwasher (52) in a groove (34) of the piston (28).

14. The clogging display defined in claim 8, characterized in that the SMA spring is made of a nickel-titanium alloy.

15. The clogging display as defined in claim 8, characterized in that the SMA spring is made of a copper-zinc-aluminum alloy.

16. The clogging display defined in claim 8, characterized in that the upper housing (3) consists of two parts (9 and 10), a low part (9) being opposite the high chamber (5) adjacent the membrane (4), and a high part (10) of larger diameter.

17. The clogging display defined in one of claims 8 and 9 characterized in that the case (1) is externally provided with a component (16) comprising a part capping the case (1), and forming a stopper (23) of the upper housing (3) and which is perforated at its center to pass a ring (43) of a flag (40).

18. The clogging display defined in claim 17 characterized in that the component (16) can rotate about the outside wall of a high part of the case (1) and that for this purpose a groove (14) is present in said case above a collar (13) whereas another groove (17) is present in an inner base of the stopper (23), a retainer ring (15) housed in these two grooves ensuring that the component (16) is linked to the case (1).

19. The clogging display defined in claim 17 characterized in that the stopper (23) of the component (16) is continuously perforated to form two consecutive passageways (18 and 19) on a common axis and having between them a shoulder (20) opposite the upper end part of the case (1) and projecting above the high part (10) of the housing (3).

20. The clogging display defined in 8, characterized in that the upper housing (3) contains means (40) for affixing a clogging flag and comprising a rod (42) provided at its base with a magnet (41) which can be forced against the membrane (4), a ring (43) colored so as to much differ from all other display parts and comprising an external collar (44) which can rest against a shoulder (20) of a stopper (23), a circular external groove (48), an inner circular rib (45), and a return spring (46) between the membrane (4) and the rib (45) and enclosing the rod (42).

21. The clogging display defined in claim 8, characterized in that a component (16) attached to the case which comprises an extension (24) having an extension chamber (21) to receive a switch (49), a duct (22) inside which a spacer or shim (53) forming a pushbutton accessory ordinarily pushed back by the pushbutton of a switch against the wall of the ring (43) and passing through the bottom of the extension chamber (21).

* * * * *